(12) United States Patent
Schilbe et al.

(10) Patent No.: US 6,475,289 B2
(45) Date of Patent: Nov. 5, 2002

(54) CLEANING OF INTERNAL PASSAGES OF AIRFOILS

(75) Inventors: John E. Schilbe, Whitehall, MI (US); Rebecca J. Boczkaja, Muskegon, MI (US); Bruce M. Warnes, Muskegon, MI (US)

(73) Assignee: Howmet Research Corporation, Whitehall, MI (US)

( * ) Notice: Subject to any disclaimer, the term of this patent is extended or adjusted under 35 U.S.C. 154(b) by 0 days.

(21) Appl. No.: 09/740,704

(22) Filed: Dec. 19, 2000

(65) Prior Publication Data

US 2002/0074017 A1 Jun. 20, 2002

(51) Int. Cl.⁷ .................................................. C23G 1/14
(52) U.S. Cl. ...................... 134/2; 134/22.1; 134/22.11; 134/22.13; 134/22.17; 134/26; 134/30; 134/42
(58) Field of Search ........................ 134/2, 22.1, 22.11, 134/22.13, 22.17, 26, 30, 42

(56) References Cited

U.S. PATENT DOCUMENTS

| | | | |
|---|---|---|---|
| 3,616,342 A | 10/1971 | Lenz et al. ................. 204/141 |
| 3,625,900 A | 12/1971 | Shoemaker et al. .......... 252/87 |
| 3,668,082 A | 6/1972 | Elmore ........................ 204/30 |
| 4,317,685 A | 3/1982 | Ahuja et al. .................. 134/2 |
| 4,437,980 A | 3/1984 | Heredy et al. .............. 208/235 |
| 4,439,241 A | 3/1984 | Ault et al. ................ 134/22.17 |
| 4,448,611 A | 5/1984 | Grellet et al. .............. 148/6.11 |
| 4,566,939 A | 1/1986 | Miller et al. ................ 156/655 |
| 4,600,443 A | * 7/1986 | Basalyk et al. ................. 134/3 |
| 4,608,092 A | 8/1986 | Tremoureux et al. ...... 148/6.11 |
| 4,965,095 A | 10/1990 | Baldi .......................... 427/142 |
| 4,966,659 A | 10/1990 | Seto et al. ..................... 204/28 |
| 5,221,358 A | 6/1993 | Malloy .......................... 134/3 |
| 5,377,398 A | 1/1995 | Bessey ....................... 29/81.07 |
| 5,505,786 A | 4/1996 | Cole et al. ..................... 134/2 |
| 5,507,306 A | 4/1996 | Irvine et al. ............ 134/166 R |
| 5,575,858 A | 11/1996 | Chen et al. .................... 134/3 |
| 5,618,353 A | * 4/1997 | Irvine et al. ............ 134/22.17 |
| 5,679,270 A | 10/1997 | Thornton et al. ........... 216/101 |
| 5,685,917 A | * 11/1997 | Sangeeta ........................ 134/2 |
| 5,779,809 A | * 7/1998 | Sangeeta ........................ 134/2 |
| 5,895,782 A | 4/1999 | Overton et al. ............. 510/254 |
| 5,955,410 A | 9/1999 | Dingess et al. ............. 510/202 |
| 5,972,424 A | * 10/1999 | Draghi et al. ............... 427/142 |
| 6,132,520 A | * 10/2000 | Schilbe et al. ................. 134/2 |
| 6,174,380 B1 | * 1/2001 | Rosenzweig et al. .......... 134/1 |
| 6,194,026 B1 | * 2/2001 | Warnes et al. .............. 427/180 |

* cited by examiner

*Primary Examiner*—Sharidan Carrillo

(57) ABSTRACT

A chemical cleaning method for cleaning an internal passage of an engine-run gas turbine engine airfoil wherein the airfoil is immersed in an inorganic hydroxide medium at superambient temperature and atmospheric pressure for a short time to remove accumulated oxides and dirt from the internal passage. The hydroxide medium can comprise molten KOH and immersion times of the engine-run airfoil not exceeding 10 minutes are involved.

13 Claims, 4 Drawing Sheets

CLEANING OF INTERNAL PASSAGES OF AIRFOILS

FIELD OF THE INVENTION

The present invention relates to cleaning of gas turbine engine-run airfoils such as turbine blades and vanes and, more particularly, to cleaning of oxides and dirt from internal cooling air passages of airfoils by immersion in an inorganic hydroxide cleaning medium for a short time.

BACKGROUND OF THE INVENTION

During service in a gas turbine engine, both the internal and external surfaces of airfoils, such as nickel or cobalt base superalloy turbine blades and vanes, suffer oxidation from environmental attack. In addition, dirt typically accumulates in the internal cooling air passages of the airfoils. The build-up of foreign material (oxidation products and/or dirt) inside the cooling air passage results in their decreased effectiveness and a resultant increase in the operating temperature of the airfoil, and ultimately a decrease in service life of the airfoil.

Gas turbine engine airfoils typically are periodically refurbished to extend their useful service life. Before the engine run airfoils are refurbished, they are cleaned to remove oxides and dirt from the internal and external surfaces of the airfoil and/or stripped of any existing protective coatings prior to recoating.

Several cleaning processes have been developed to clean internal cooling passages of gas turbine engine airfoils. U.S. Pat. No. 5,507,306 describes a process where a KOH solution at elevated temperature is sprayed under pressure into the airfoil internal cooling passages. U.S. Pat. No. 4,439,241 discloses a high pressure autoclave cleaning process using a KOH solution to remove internal deposits from airfoils. Most of these cleaning processes involve relatively complex equipment, which is expensive to build and maintain. Moreover, many of the cleaning processes are relatively slow to clean the internal passages of oxides and dirt, requiring long processing time and increasing the cost to refurbish airfoils.

It is an object of the present invention to provide a method for cleaning internal passages of an engine-run gas turbine engine airfoils that overcomes the above disadvantages.

SUMMARY OF THE INVENTION

The present invention provides a chemical cleaning method for cleaning an internal passage of an engine-run gas turbine engine airfoil wherein the airfoil is immersed in an inorganic hydroxide medium at superambient temperature and atmospheric pressure for a short time to remove accumulated foreign material, such as oxides and dirt, from the surface of the internal passage without adversely chemically attacking the airfoil, which may comprise a nickel or cobalt base superalloy in the event the airfoil is not protectively coated or a protective coating in the event the airfoil is protectively coated prior to engine service. Preferably, the hydroxide medium comprises molten KOH. Immersion time of the engine-run airfoil in the hydroxide medium preferably does not exceed 360 minutes and even more preferably does not exceed 10 minutes. For purposes of illustration and not limitation, the inorganic hydroxide medium can comprise a 90 weight % KOH and 10 weight % water solution at 575 degrees F. disposed at atmospheric pressure with immersion times not exceeding 10 minutes.

The present invention provides a refurbished gas turbine engine run airfoil having a cleaned internal passage surface that can be coated to form a protective coating thereon. The coating may include distinct oxide regions therein that formerly were present as sub-surface internal oxide regions in the cleaned airfoil prior to coating.

The above and other objects and advantages of the present invention will become more readily apparent from the following drawings taken in conjunction with the following detailed description.

DESCRIPTION OF THE INVENTION

Figure 1:
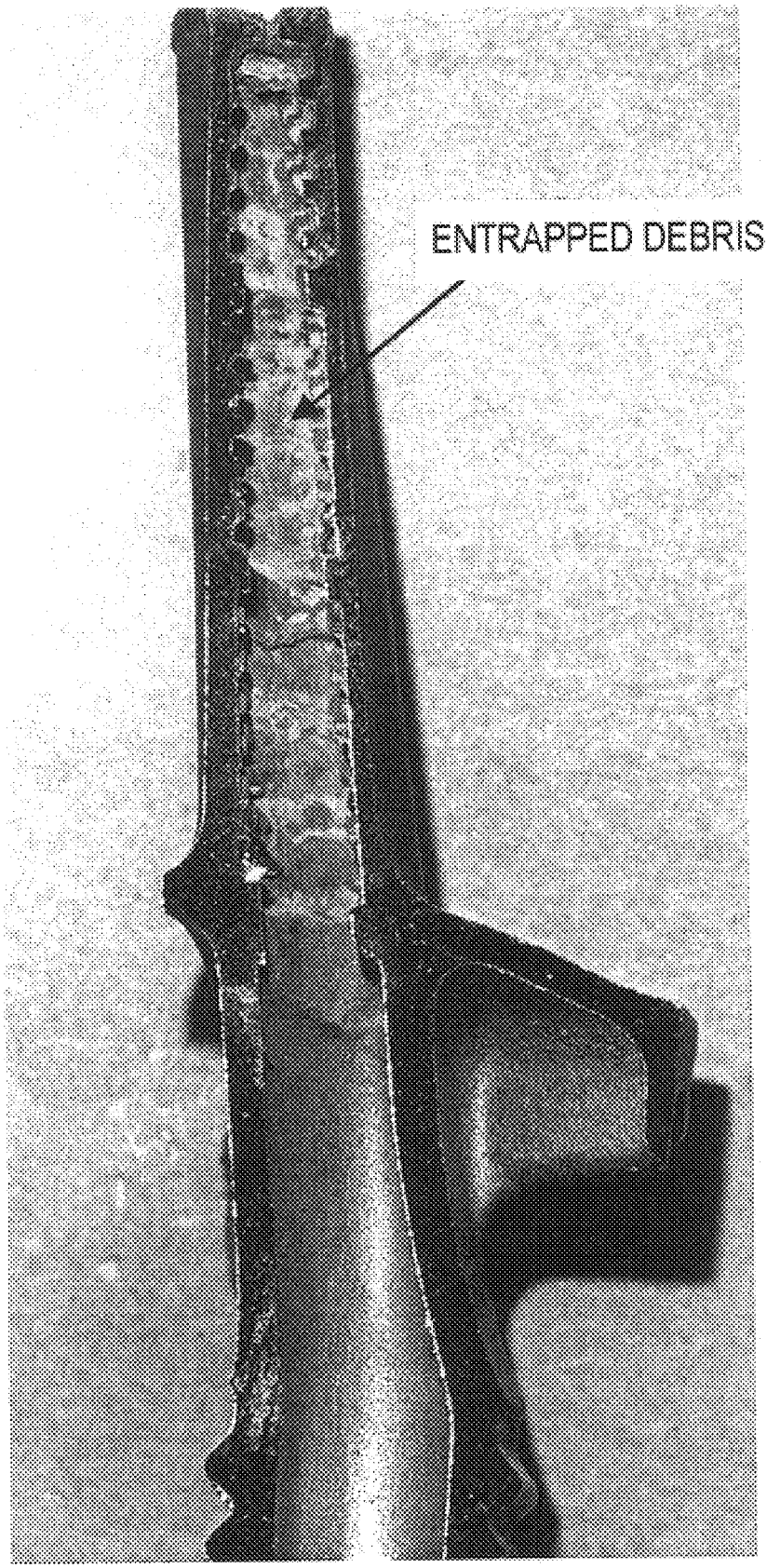
FIG. 1 is photograph of an engine-run gas turbine blade cut longitudinally to reveal oxide scale and dirt in the internal cooling air passage.

The present invention involves a chemical cleaning method for cleaning an internal passage of an engine-run gas turbine engine airfoil that includes turbine blades and vanes. By engine-run is meant that the airfoil has experienced operation in a gas turbine engine, such as the high temperature turbine section of the engine. The invention is useful to clean internal cooling air passages in engine-run gas turbine engine airfoils that are cast from nickel or cobalt base superalloys and that have exterior airfoil surfaces that typically have been coated with a protective coating prior to entering service in the engine. The internal cooling air passages may also be coated with a protective coating, or they may be uncoated. For example, exterior surfaces of a nickel or cobalt base superalloy airfoil may be coated with a conventional simple or platinum modified diffusion aluminide protective coating, a conventional Mcraly protective coating where M is selected from Ni and/or Co and/or Fe, a conventional ceramic thermal barrier coating, and combinations of such coatings, to provide oxidation and hot corrosion protection during service in the gas turbine engine. The internal cooling air passage can be uncoated or coated with a simple diffusion aluminide protective coating.

In accordance with the invention, an engine-run gas turbine engine airfoil includes accumulated foreign material including surface oxides and/or dirt on the internal cooling air passage surfaces and exterior airfoil surfaces that are cleaned in a relatively short period of time to remove the foreign material. The surface oxides can comprise an external oxide scale or layer formed during engine service on the surfaces of the internal cooling air surfaces. These surfaces will comprise the superalloy substrate in the event the internal cooling air passages are exposed to engine service in the uncoated condition or will comprise a protective coating in the event the internal cooling air passage is coated with a protective coating prior to engine service. The surface oxides also may comprise internally oxidized regions of the airfoil below the surfaces of the internal air cooling surfaces. Dirt that may be present as a result of engine service includes, but is not limited to, $SiO_2$, CaO, $Fe_2O_3$, complex compounds such as silicates, chloride-bearing compounds, and other foreign materials present on the surfaces of the internal air cooling surfaces, the particular composition of which depends on the conditions of engine service and where the engine-service occurred.

The invention involves immersing one or more engine-run airfoils in an inorganic hydroxide medium at superambient temperature and atmospheric pressure for a short time to remove the accumulated foreign material including surface oxides and dirt from the internal cooling air passage without adversely chemically attacking the nickel or cobalt base superalloy surface in the event the internal passage is not protectively coated, or the protective coating surface if the internal passage is protectively coated. Oxides and dirt accumulated on the exterior airfoil surface are removed during stripping of a protective coating typically present on the exterior surfaces. Some internal, sub-surface oxides present below the surfaces of the cooling air passage may remain after cleaning. These internal oxides have been found not to have an adverse effect on subsequent recoating of the cleaned internal cooling air passage with a protective coating.

The inorganic hydroxide medium preferably comprises molten KOH, NaOH, $Ca(OH)_2$, $Mg(OH)_2$ and other alkali and alkaline earth hydroxides where the hydroxide comprises 80% by weight or greater of the cleaning medium and balance typically water. A molten inorganic hydroxide medium with no water can be used as well if available.

The inorganic hydroxide medium also may comprise KOH, NaOH, $Ca(OH)_2$, $Mg(OH)_2$ and other alkali and alkaline earth hydroxide aqueous solutions where the hydroxide comprises at least 50% by weight of the cleaning medium and balance typically water with the medium at a suitable superambient temperature, such as about 275 degrees F. and greater.

The hydroxide medium is heated at ambient pressure to an elevated superambient temperature selected to place the hydroxide medium in the liquid or molten state in a suitable vessel. For example only, for commercially available and pure KOH that comprises 90 weight % KOH and balance water, a superambient temperature of about 400 degrees F. and greater (e.g. 400 to 500 degrees F.) is provided to maintain the KOH medium in the molten (liquid) state in the vessel, which may comprise a kettle having a top opening communicated to or open to ambient atmospheric pressure. The kettle can be heated externally by electrical resistance heating elements or any other heating means to maintain the KOH medium at the desired superambient temperature.

Immersion time of the engine-run airfoil in the molten inorganic hydroxide medium preferably does not exceed 360 minutes and even more preferably does not exceed 10 minutes.

Pursuant to an embodiment of the invention, an engine-run gas turbine engine airfoil is subjected to a refurbishment or repair operation wherein the accumulated foreign material is removed from the exterior airfoil surfaces by stripping of the protective coating typically present on the exterior surfaces and from the internal air cooling passages pursuant to the invention without chemical attack or other damage to the airfoil superalloy substrate or any protective coating thereon by the chemical cleaning method.

The present invention has been demonstrated in cleaning oxides and/or dirt from the internal air cooling passage of certain engine-run first stage, high pressure gas turbine blades comprising a nickel or cobalt base superalloy. These turbine blades were exposed to service in a C-130 transport aircraft gas turbine engine with no protective coating on the internal air cooling passages and with a CoCrAlY overlay protective coating on the exterior airfoil surfaces.

Figure 2:
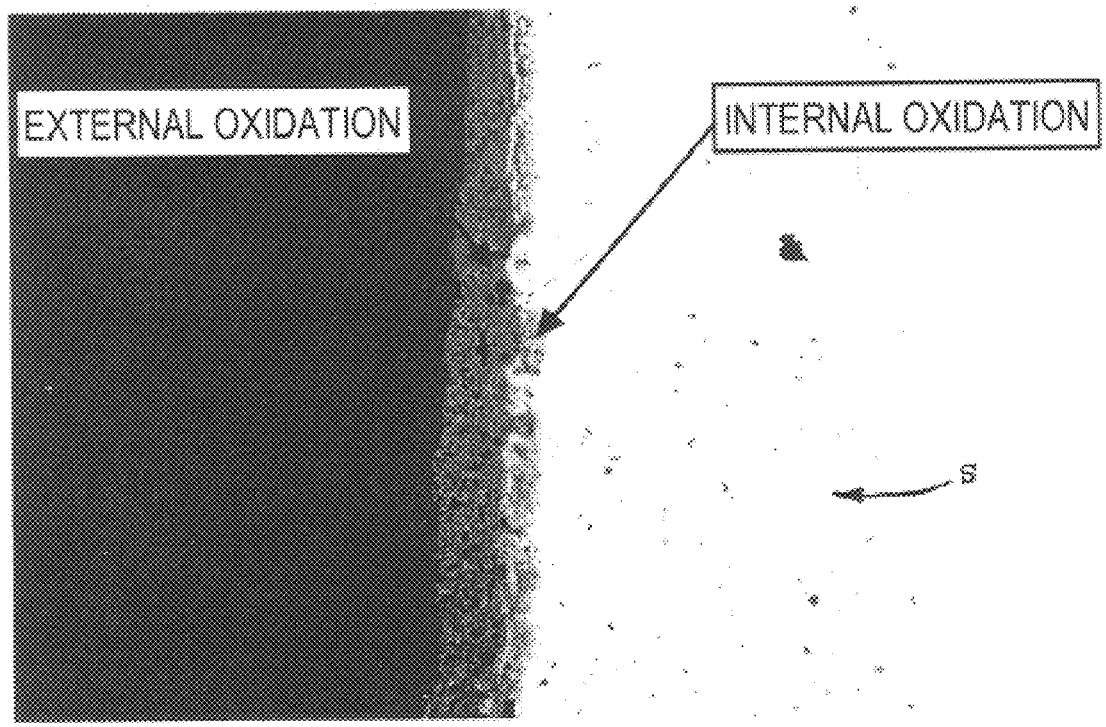
FIG. 2 is a photomicrograph at 200× of a surface region of the internal cooling air passage from a cross-section of the engine-run airfoil showing external surface oxidation and internal subsurface oxidation.

FIG. 1 illustrates an engine-run turbine blade representative of the type exposed to engine service and subsequently cleaned pursuant to the invention. In FIG. 1, the turbine blade has been cut longitudinally to reveal the internal air cooling passage. Examination of the internal cooling passages revealed extensive oxidation and build-up of dirt designated "entrapped debris & build-up". Metallographic examination of a surface region of a cross-section through the internal air cooling passage revealed that there was extensive external and internal oxidation of the subsurface of the airfoil substrate S in the form of distinct, discontinuous oxide regions in the superalloy substrate as revealed in FIG. 2.

The internal air cooling passages of the engine-run turbine blades then were cleaned pursuant to the invention. For example, a vessel was filled with a metal hydroxide flake, particularly KOH, and was heated by an electrical resistance coil about the vessel to produce a molten KOH bath at 575 degrees F. at atmospheric pressure. The temperature of the molten KOH was monitored and controlled using a Type K sheathed thermocouple in the molten KOH. The turbine blades were immersed in the molten KOH medium for 10 minutes followed by a cold water rinse after being removed from the KOH medium.

Figure 3:
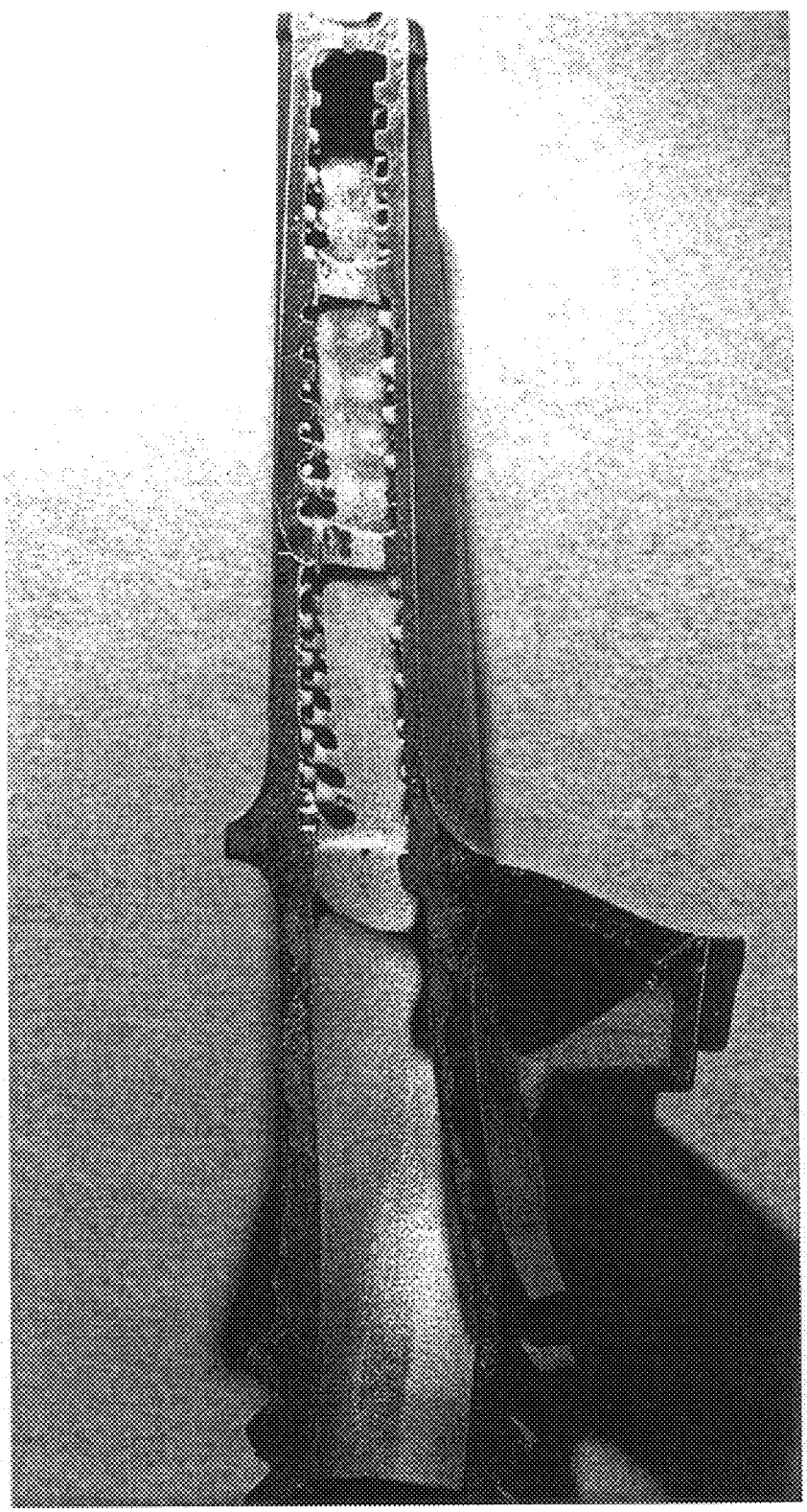
FIG. 3 is photograph of the engine-run gas turbine blade of FIG. 1 after cleaning pursuant to the invention.
Figure 4:
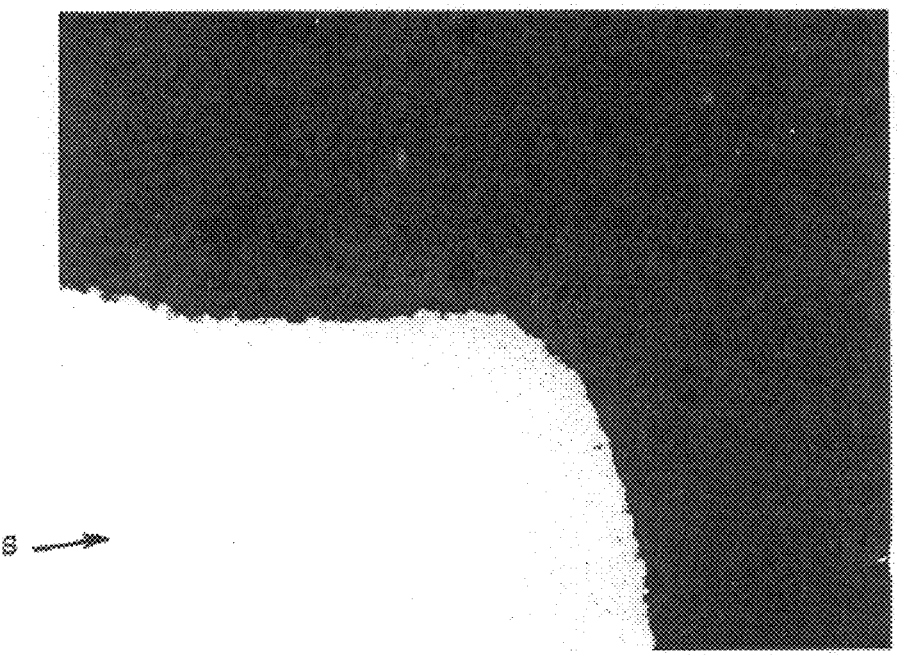
FIG. 4 is a photomicrograph at 200× of a surface region of the internal cooling air passage from a cross-section of an engine-run airfoil after cleaning pursuant to the invention showing removal of the external oxidation scale from the passage surface without substrate damage. The airfoil substrate is the light feature in FIG. 4, whereas the dark feature is metallographic mounting material.

The cleaning method pursuant to the invention was effective to remove accumulated foreign material including oxide scale and dirt on the surfaces of the internal cooling air passages as can be seen by comparing FIGS. 3–4. Metallographic examination of cleaned cross-sections of external surface regions of the cooling air passages revealed that subsurface internal oxide regions present in the superalloy substrate, FIG. 2, were not completely dissolved during immersion in the molten KOH medium.

Several of the engine-run turbine blades (e.g. 6 blades) then were cleaned by removing (stripping) the CoCrAlY overlay coating from the exterior airfoil surfaces using a commercially well known chemical acid stripping method.

Figure 5:
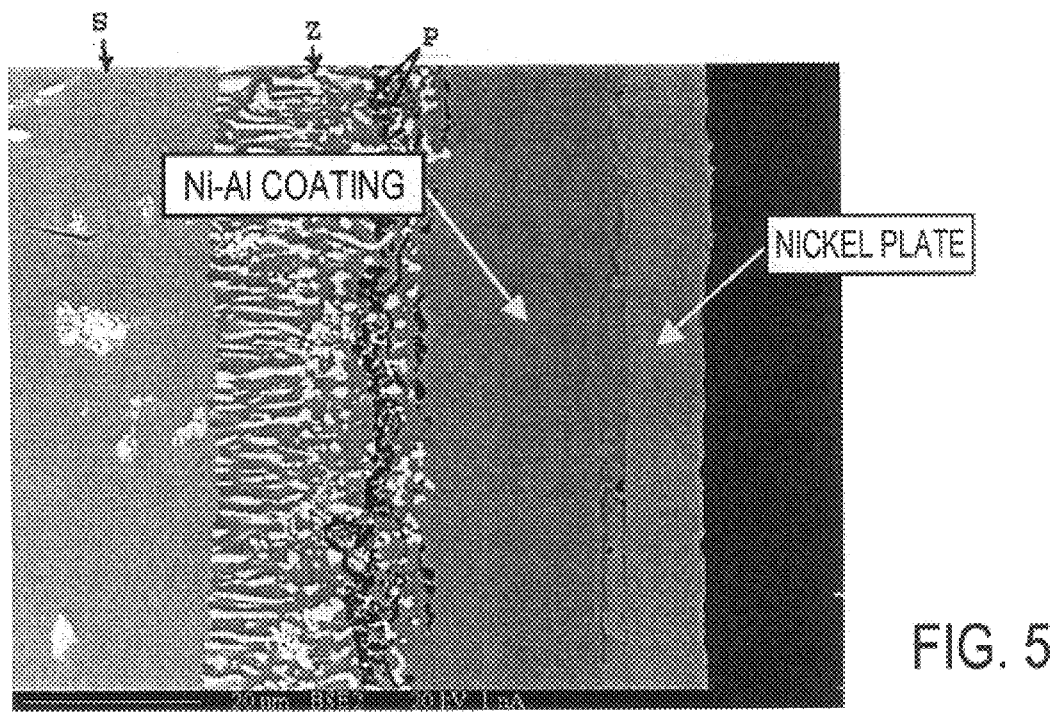
FIG. 5 is a photomicrograph at 800× of a surface region of the internal cooling air passage from a cross-section of the engine-run airfoil after cleaning pursuant to the invention and recoating with a Ni—Al diffusion aluminide coating.

The exterior airfoil surfaces of the cleaned turbine blades then were coated with a fresh protective outwardly grown diffusion platinum modified aluminide coating as described in U.S. Pat. Nos. 5,658,614; 5,788,823; and 6,136,451 where the exterior surfaces were plated with platinum and then CVD (chemical vapor deposition) aluminized as described in the patents. The surfaces of the internal cooling air passages were coated using similar CVD aluminizing parameters but without an initial Pt plating operation. FIG. 5 shows a cross-section of the Ni—Al diffusion aluminide additive coating formed on the internal cooling air passage surface of the airfoil substrate S where the coating includes an inner diffusion zone Z with the distinct, discontinuous internal oxide regions P (discontinuous dark regions formed during prior engine service and not removed during cleaning) incorporated in an outer portion of the diffusion zone Z adjacent to the outer single phase Ni—Al diffusion aluminide additive layer or coating. The designated nickel plate on the Ni—Al diffusion aluminide coating is used in preparation of the metallographic sample. From FIG. 5, it is apparent that the discontinuous internal oxide regions present in the airfoil substrate after molten KOH cleaning did not inhibit the CVD aluminizing process and were included in the diffusion aluminide coating as discontinuous oxide regions.

The present invention is advantageous to clean internal cooling air passages of engine-run airfoils at ambient pressure and in very short times without damage to the substrate or any protective coating thereon. The process is economical with process cycle times preferably not exceeding 10 minutes and low capital cost for equipment.

Although the invention has been described in detail above with respect to certain embodiments, those skilled in the art will appreciate that modifications, changes and the like can be made therein without departing from the spirit and scope of the invention as set forth in the appended claims.

We claim:

1. A method of cleaning an internal passage of a gas turbine engine-run airfoil, comprising the steps of:
    a) providing a gas turbine engine-run airfoil that has been used in a gas turbine engine such that foreign material is present in an internal passage of said airfoil,
    b) providing a vessel open to ambient atmospheric pressure and containing a liquid, said liquid comprising at least 50%. by weight of a hydroxide selected from the group consisting of an alkali hydroxide and an alkaline earth hydroxide and the balance water, and
    c) cleaning said airfoil in said vessel open to said ambient atmospheric pressure by immersing said airfoil in said liquid for a period of time to remove foreign material from the internal passage of said airfoil, wherein said liquid is at said ambient atmospheric pressure and at a temperature of about 275 degrees F. and above during said cleaning step.

2. The method of claim 1 wherein the foreign material comprises oxide and dirt on a surface of the internal passage.

3. The method of claim 1 wherein the airfoil is immersed for a period of time up to 360 minutes.

4. The method of claim 1 wherein the airfoil comprises a nickel or cobalt base superalloy.

5. The method of claim 1 wherein said airfoil includes internally oxidized regions that are disposed below a surface of said internal passage and that remain below said surface after said immersion.

6. The method of claim 5 further including forming a coating on said surface of said internal passage such that the internally oxidized regions reside in the coating.

7. The method of claim 6 wherein the coating comprises a diffusion aluminide coating.

8. A method of cleaning an internal passage of a gas turbine engine-run airfoil, comprising the steps of:
    a) providing a gas turbine engine-run airfoil that has been used in a gas turbine engine such that foreign material is present in an internal passage of said airfoil,
    b) providing a vessel open to ambient atmospheric pressure and containing a molten hydroxide, said molten hydroxide comprising 80 weight % or greater of a hydroxide selected from the group consisting of an alkali hydroxide and an alkaline earth hydroxide and the balance water, and
    c) cleaning said airfoil in said vessel open to said ambient atmospheric pressure by immersing said airfoil in said molten hydroxide for a period of time to remove foreign material from the internal passage of said airfoil, wherein said molten hydroxide is at said ambient atmospheric pressure and at a temperature of about 400 degrees F. and above during said cleaning step.

9. The method of claim 8 wherein the molten alkali dioxide comprises molten KOH.

10. The method of claim 8 wherein said airfoil includes internally oxidized regions that are disposed below a surface of said internal passage and that remain below said surface after said immersion.

11. The method of claim 8 wherein the airfoil comprises a nickel or cobalt base superalloy.

12. The method of claim 10 further including forming a coating on said surface of said internal passage such that the internally oxidized regions reside in the coating.

13. The method of claim 12 wherein the coating comprises a diffusion aluminide coating.

* * * * *

UNITED STATES PATENT AND TRADEMARK OFFICE
CERTIFICATE OF CORRECTION

PATENT NO. : 6,475,289 B2
DATED : November 5, 2002
INVENTOR(S) : John E. Schilbe et al.

It is certified that error appears in the above-identified patent and that said Letters Patent is hereby corrected as shown below:

<u>Column 5,</u>
Line 28, delete ".".

Signed and Sealed this

Twenty-fifth Day of February, 2003

JAMES E. ROGAN
*Director of the United States Patent and Trademark Office*